United States Patent
Marriott

(10) Patent No.: US 7,685,976 B2
(45) Date of Patent: Mar. 30, 2010

(54) INDUCTION TUNING USING MULTIPLE INTAKE VALVE LIFT EVENTS

(75) Inventor: Craig D. Marriott, Clawson, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 778 days.

(21) Appl. No.: 11/389,568

(22) Filed: Mar. 24, 2006

(65) Prior Publication Data

US 2007/0221148 A1 Sep. 27, 2007

(51) Int. Cl.
*F01L 1/34* (2006.01)
(52) U.S. Cl. .............. 123/90.15; 123/90.17; 123/348
(58) Field of Classification Search ........... 123/90.15, 123/90.16, 90.17, 90.18, 345, 346, 347, 348
See application file for complete search history.

(56) References Cited

U.S. PATENT DOCUMENTS 4,572,114 A * 2/1986 Sickler ............. 123/21
6,311,653 B1 * 11/2001 Hamamoto ......... 123/90.11
6,810,844 B2 * 11/2004 Sellnau ............. 123/90.16
7,069,887 B2 * 7/2006 Cornell et al. ...... 123/90.12

FOREIGN PATENT DOCUMENTS

JP          03168328 A   *   7/1991

OTHER PUBLICATIONS

Tsuruoka et al., Intake Device of Multi-Cylinder Engine, US PAtent Application Publication Pub. No. US 2006/0070595 A1, Apr. 6, 2006.*
Usko et al., Rocker Arm System for Engine Valve Actuation, US Patent Application Pub., US 2005/0274341 A1, Dec. 15, 2005.*

* cited by examiner

*Primary Examiner*—Ching Chang

(57) ABSTRACT

A tuned induction control system for an engine at or near full load having a piston that is reciprocally disposed in a cylinder includes a first module that actuates an intake valve associated with the cylinder and a second module that determines a second intake valve open timing based on an intake air temperature, pressure and an engine speed. The first module actuates the intake valve during a first intake event and actuates the intake valve during a second intake event that is subsequent to the first intake event. The first and second intake events occur during a common intake stroke of the piston and the intake valve is opened at the second intake valve open timing during the second intake event.

19 Claims, 6 Drawing Sheets

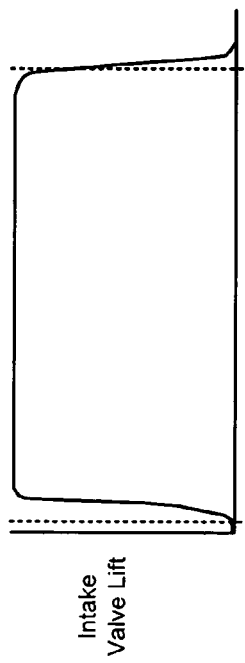
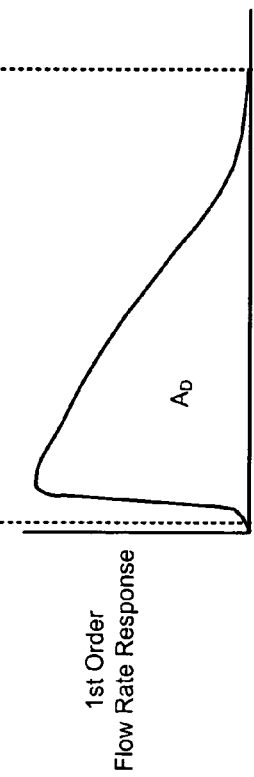
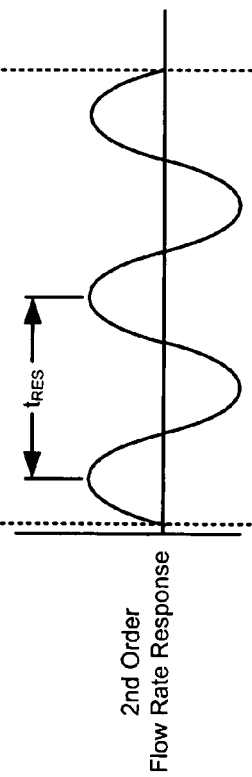
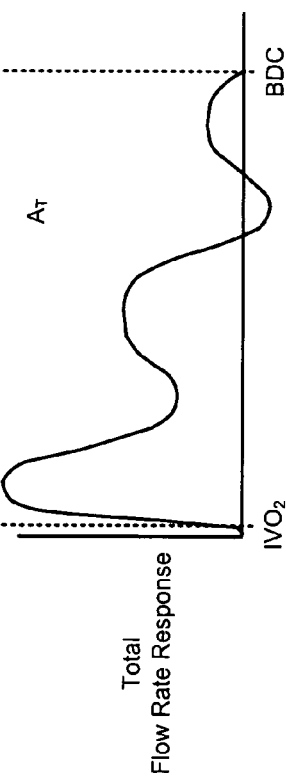

INDUCTION TUNING USING MULTIPLE INTAKE VALVE LIFT EVENTS

FIELD OF THE INVENTION

The present invention relates to internal combustion engines, and more particularly to induction tuning using multiple intake valve lift events to increase the volumetric efficiency of an engine at or near full load.

BACKGROUND OF THE INVENTION

Internal combustion engines mix ingested air with fuel to form a combustion mixture. The combustion mixture is compressed and is combusted within a cylinder to reciprocally drive a piston, thereby generating drive torque. The mass of air and fuel within the combustion mixture effects engine torque output and emissions.

An engine system's volumetric efficiency refers to the actual volume of air that is ingested by a cylinder as compared to the theoretical volume of air that could be ingested. For example, an engine system with an 80% volumetric efficiency is only ingesting 80% of the air volume that it theoretically could ingest. Engine systems that operate with volumetric efficiencies lower than 100% produce less maximum torque than they are theoretically capable of producing. However engines are not limited to 100% volumetric efficiency with proper induction tuning Traditionally, increased volumetric efficiencies (e.g., greater than 90%) over a wide speed range have been achieved by adding components to the induction system. For example, some engine systems implement an additional valve within the intake runner, which is selectively opened and closed to produce an air ramming effect at engine cycle frequencies away from the natural frequency of the induction system. Although increases in volumetric efficiency can be achieved, increased cost and complexity are associated with such engine systems. Other traditional engine systems either also include additional components and/or are able to achieve volumetric efficiency higher than 90% over only a limited engine speed range.

SUMMARY OF THE INVENTION

Accordingly, the present invention provides a tuned induction control system for an engine having a piston that is reciprocally disposed in a cylinder. The tuned induction control system includes a first module that actuates an intake valve associated with the cylinder and a second module that determines a second intake valve open timing based on an intake air temperature and an engine speed. The first module actuates the intake valve during a first intake event and actuates the intake valve during a second intake event that is subsequent to the first intake valve event. The first and second intake valve events occur during a common intake stroke of the piston and the intake valve is opened at the second intake valve open timing during the second intake event.

In another feature, the second intake valve open timing is further based on a natural frequency of an induction system of the engine and a volume of the cylinder when the piston is at a bottom dead center position.

In another feature, the tuned induction control system further includes a third module that determines a first intake valve close timing based on the second intake valve open timing and expansion ratio of the cylinder.

In another feature, the first module ends the first intake event by closing the intake valve at a first intake valve close timing, which occurs a predetermined time before the subsequent second intake valve event and is based on the second intake valve open timing.

In another feature, the first module initiates the first intake event near to the cylinder achieving a top dead center position during an exhaust stroke.

In still another feature, the first module ends the subsequent second intake event near to the cylinder achieving a bottom dead center position during the intake stroke.

In yet another feature, the tuned induction control system further includes a third module that determines a minimum lift amount of the intake valve during the first intake event based on an engine speed.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4 is a graph illustrating a trace of the second intake valve lift;

FIG. 5 is a graph illustrating a first order air flow response that is achieved using the induction tuning control of the present invention;

FIG. 6 is a graph illustrating a second order air flow response that is achieved using the induction tuning control of the present invention;

FIG. 7 is a graph illustrating the total flow response that is achieved using the induction tuning control of the present invention;

DETAILED DESCRIPTION OF THE PREFERRED EMBODIMENTS

Figure 1:
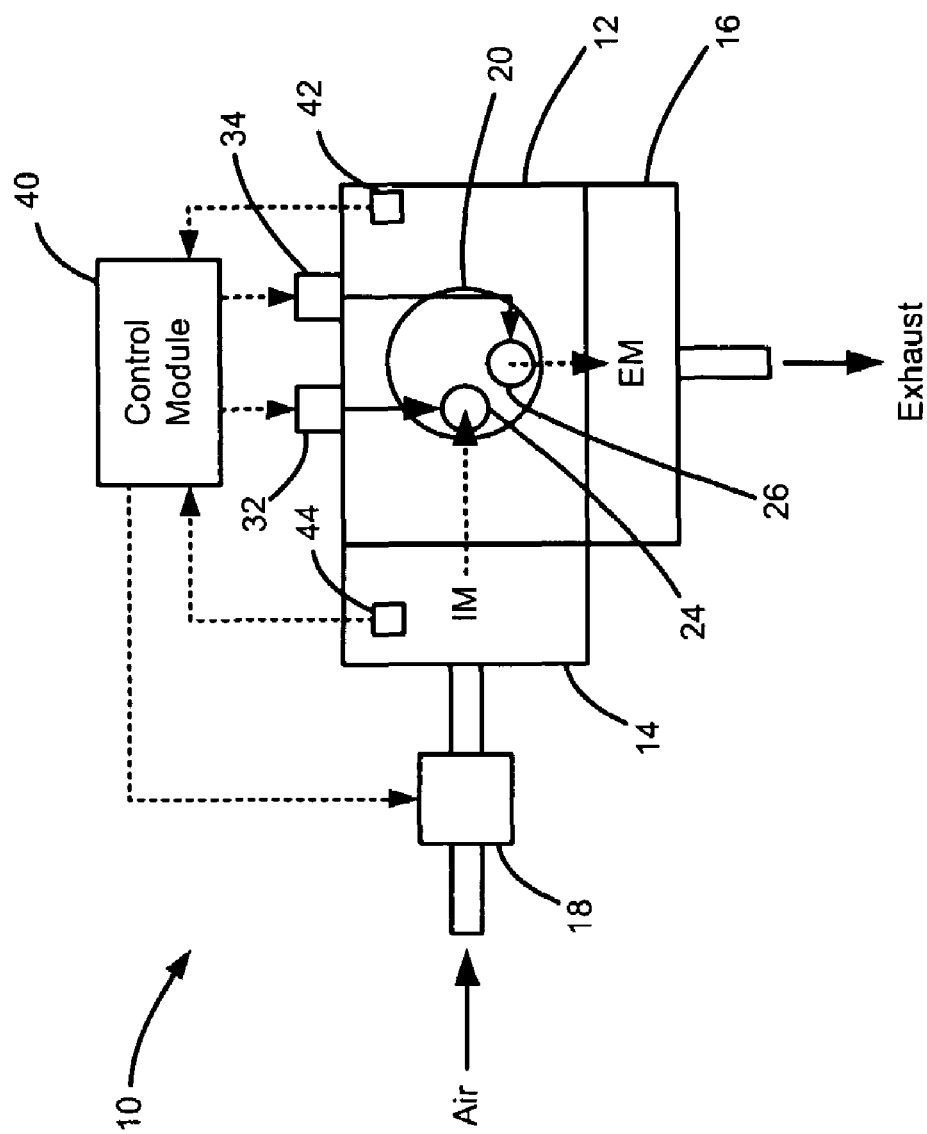
FIG. 1 is a functional block diagram of an engine system that is operated based on the induction tuning control of the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Figure 2:
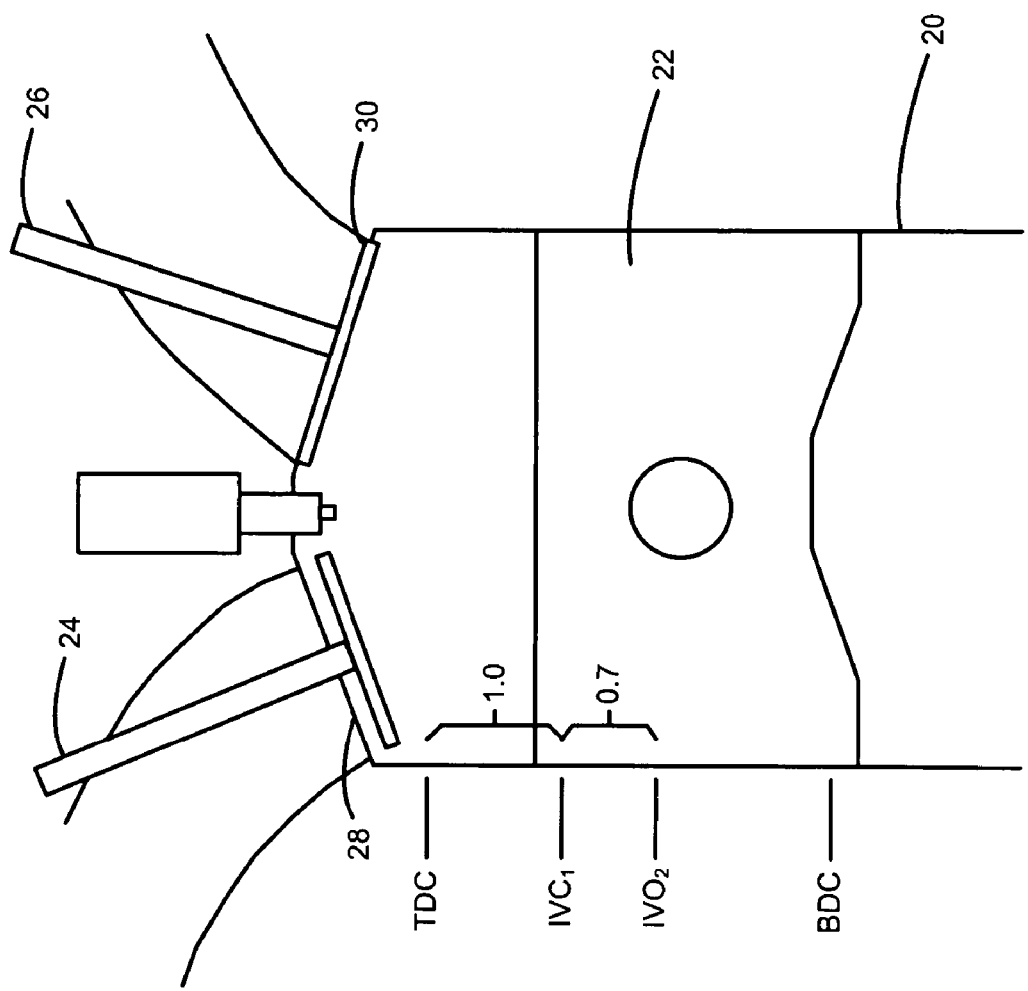
FIG. 2 is a schematic illustration of an exemplary cylinder of the engine system of FIG. 1.

Referring now to FIGS. 1 and 2, an engine system 10 is illustrated and includes an engine 12 having an intake manifold 14 and an exhaust manifold 16. Air is drawn into the intake manifold 14 through a throttle 18. The air is mixed with fuel and the air and fuel mixture is combusted within a cylinder 20 to reciprocally drive a piston 22. Although a single cylinder 20 is illustrated, it is anticipated that the engine 12 can include a single cylinder 20 or a plurality of cylinders 20.

An intake valve 24 and an exhaust valve 26 are also provided and selectively enable fluid flow through intake and exhaust ports 28, 30, respectively. Although single intake and exhaust valves 24, 26 and respective ports 28, 30 are illustrated, it is anticipated that the engine 12 can include multiple intake and/or exhaust valves 24, 26 per cylinder 20, and multiple ports per cylinder. Intake and exhaust valve actuators 32, 34 regulate operation of the intake and exhaust valves 24, 26, respectively, based on the induction tuning control of the present invention. More specifically, the intake and exhaust valve actuators 32, 34 regulate the timing (i.e., with respect to the position of the piston 22 within the cylinder 20) of the opening of the intake and exhaust valves 24, 26, as well as the degree to which the intake and exhaust valves 24, 26 are opened, otherwise called lift.

During the combustion process of a four-cycle spark ignition engine, the intake valve 24 is lifted to open the intake port 28 and draw air into the cylinder 20. When the piston 22 is at or near the bottom dead center (BDC) position, the intake valve 24 is closed. The air and fuel mixture is compressed as the piston 22 is driven back to the top dead center (TDC) position. When the piston 22 is at or near TDC, the air and fuel mixture is combusted, driving the piston 22 back toward BDC. When the piston 22 is at or near BDC, the exhaust valve 26 is lifted to open the exhaust port 30. The piston 22 is driven back toward TDC, pushing the exhaust gas out the exhaust port 30 and into the exhaust manifold 16. When the piston 22 is at or near TDC, the exhaust port 30 is closed, and the process is repeated. It is appreciated, however, that the present invention is not limited to application in a four-cycle spark ignition engine, but may also be implemented in other engine configurations (e.g., four-cycle diesel).

A control module 40 regulates operation of the engine system 10 based on various engine operating parameters and operator inputs. An engine speed sensor 42 is responsive to engine RPM and generates an engine RPM signal based thereon. An intake manifold air temperature sensor 44 is responsive to the air temperature within the intake manifold ($T_{IM}$) and generates a $T_{IM}$ signal based thereon.

The control module 40 regulates operation of the engine system 10 based on the induction tuning control of the present invention. More specifically, the induction tuning control of the present invention induces air and/or fuel into the cylinders at relatively high fluid velocities in order to provide a ram charging effect that is independent of engine speed. In order to achieve the high fluid velocities at engine speeds that are below the natural tuning frequency of the intake system (i.e., intake manifold and runners), the driving force of the fluid intake (i.e., air and/or fuel) is decoupled from the piston velocity by creating a near critical vacuum (e.g., a pressure ratio≈1:2) within the cylinder relative to the intake port pressure prior to opening the intake valve.

The intake valve is opened rapidly to minimize throttling losses and to enable the cylinder vacuum to be efficiently converted into kinetic energy of the inducted charge. This kinetic energy also provides significant excitation of the natural resonance of the induction system. The resulting pressure oscillations of the induction system resonance (i.e., Hemholtz resonance) enables more fluid mass (i.e., air and/or fuel) to be trapped within the cylinder if the piston position and the inlet valve closure (IVC) events are in proper phase with these oscillations. Ideally, the phase relationship provides the maximum cylinder filling near BDC and the IVC event occurs just at the point of velocity reversal through the intake valve.

Figure 3:
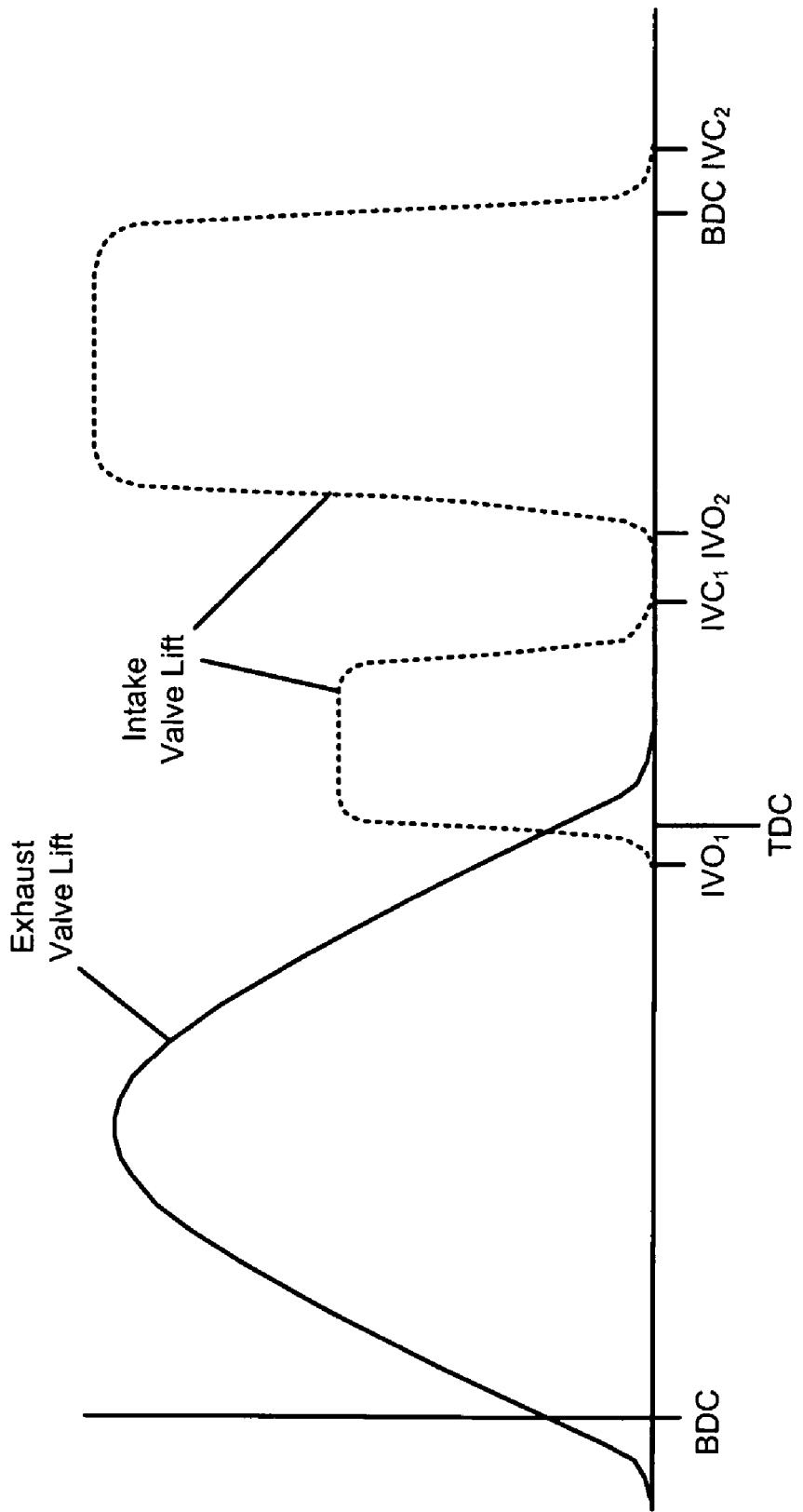
FIG. 3 is a graph illustrating exemplary an exhaust valve lift, an first intake valve lift and a second intake valve lift in accordance with the induction tuning control of the present invention.

Referring now to FIG. 3, a valve-timing diagram illustrates exemplary intake and exhaust valve lift traces in accordance with the induction tuning control of the present invention. More specifically, the induction tuning control achieves the ram charging effect, whereby the intake valve actuator provides multiple intake valve events per combustion cycle. The initial intake valve opening ($IVO_1$) occurs at a time similar to a conventional inlet valve profile and is optimized to minimize the exhaust residual trapped in the cylinder. For example, $IVO_1$ occurs just before the piston achieves TDC. The intake valve lift (i.e., degree to which the intake valve is opened) is sufficient to allow a specific mass of air to be trapped within the cylinder and is only opened enough to sufficiently avoid a throttling effect (i.e., a pressure drop across the intake valve). More specifically, the amount of lift at $IVO_1$ ($LIFT_1$) is determined based on the engine RPM. In this manner, the intake valve is not required to achieve full lift, which may conserve valve actuation energy.

The first inlet valve closing ($IVC_1$) event, the second inlet valve opening ($IVO_2$) event and the second inlet valve closing ($IVC_2$) event are all timed based on and relative to the piston/crankshaft position. More specifically, $IVC_2$ occurs near BDC of the piston intake stroke, where the cylinder volume is at a maximum. This timing also occurs simultaneously with the reversal of airflow through the intake port, which is dependent on phasing of the inlet runner Hemholtz resonance, which is discussed in further detail below with respect to FIG. 6. The lift at $IVO_2$ ($LIFT_2$) is preferably a maximum lift ($LIFT_{MAX}$) to enable the maximum air flow into the cylinder, with the minimum practical throttling losses.

$IVO_2$ determines the phasing and number of Hemholtz resonance oscillations at the time of $IVC_2$. Therefore, $IVO_2$ is timed such that the phase of the inlet air volumetric flow rate displacement is at direction reversal directly following a positive amplitude oscillation at or near BDC (see FIG. 6). The $IVO_2$ also occurs when the cylinder pressure is nearly critical relative to the pressure of the inlet port. The timing of $IVC_1$ is dependent on the timing of $IVO_2$, such that a near critical pressure can be achieved within the cylinder. In order to achieve the near critical pressure, the expansion ratio ($R_{EXP}$) of the cylinder volume between the $IVC_1$ and $IVO_2$ should be near 1.7:1. It is important not to execute $IVO_2$ late or $IVC_1$ too early, because the cylinder pressure will expand beyond critical pressure and create significant losses through shock waves at the intake valve.

The opening and closing of the intake valve occurs very rapidly to minimize losses as the inducted charge begins to rush through the intake port. As a result, time-based valve actuators including, but not limited to, electro-hydraulic or electro-mechanical systems that are capable of opening the inlet valve rapidly and independent of engine speed are preferred.

$IVO_2$ is determined based on the engine configuration parameters, engine RPM and $T_{IM}$. More specifically, the engine configuration parameters include, but are not limited to, the natural frequency of the intake system ($f_{INDSYS}$) and the cylinder volume ($V_{CYL}$) at BDC, both of which are known, fixed parameters. Accordingly, a look-up table is created based on the engine configuration parameters, engine RPM and $T_{IM}$. $IVO_2$ is determined from the look-up table based on engine RPM and $T_{IM}$.

Referring now to FIGS. 4 through 7, the induction tuning control of the present invention will be described in further detail. FIG. 4 illustrates the second intake valve opening event, which begins at $IVO_2$. As a result of the intake valve opening at $IVO_2$, first and second order air flow responses are induced as air flows into the cylinder. As illustrated in FIG. 5, the first order air flow response (i.e., DC component) rapidly peaks and subsequently follows the piston velocity as the piston moves to BDC.

As illustrated in FIG. 6, the intake valve opening at $IVO_2$, excites the Hemholtz resonance of the intake system creating a second order, sinusoidal pulse wave (i.e., AC component), which is used to provide the ramming effect and to achieve an increased volumetric efficiency. More specifically, the resonance includes a period ($t_{RES}$) that defines $f_{INDSYS}$ (i.e., $f_{INDSYS}=1/t_{RES}$), which is fixed for the intake system at any measured temperature and pressure. $IVO_2$ is timed such that the resonance immediately after a positive flow rate wave is zero at BDC. In this manner, additional air is rammed into the cylinder by the resonance wave immediately prior to $IVC_2$, increasing the volumetric efficiency of the engine system. The engine RPM determines the number of resonance waves that are achieved prior to $IVC_2$, because $f_{INDSYS}$ is fixed and there is little damping of the resonance wave. For example, at a higher engine RPM, less resonance waves are achieved before $IVC_2$, whereas more resonance waves may be achieved with lower engine RPM. That is, because the piston is moving slower at lower engine RPM, there is more time before $IVC_2$, within which the resonance waves are achieved. It is possible and perhaps better to maintain the same number of oscillations at all speeds by changing the $IVC_1$ and $IVO_2$ timing accordingly.

FIG. 7 illustrates the total air flow response including the combined first and second order air flow responses. By comparing the area beneath the first order flow response curve ($A_D$) and the area beneath the total air flow response curve ($A_T$), the increased air flow into the cylinder, and thus the increased volumetric efficiency is seen. More specifically, $A_T$ is greater than $A_D$. As a result, the amount of air mass trapped in the cylinder without the induction control of the present invention (i.e., $A_D$) is significantly less than that using the induction control of the present invention (i.e., $A_T$).

It is anticipated that the induction tuning control of the present invention can be implemented with an engine system including a single intake valve or an engine system including multiple intake valves. In the case of a single intake valve, the single intake valve is opened and closed in accordance with the induction tuning control described herein. In the case of multiple intake valves, the initial intake event can be executed using a single intake valve or multiple intake valves. For example, the single intake valve can be open to $LIFT_1$, while the other intake valves remain closed, or all of the intake valves can be opened to pre-determined lifts and achieve the same intake as a single intake valve opened to $LIFT_1$. Similarly, the second intake event can be achieved using a single intake valve or all of the intake valves, in a multiple intake valve system.

Figure 8:
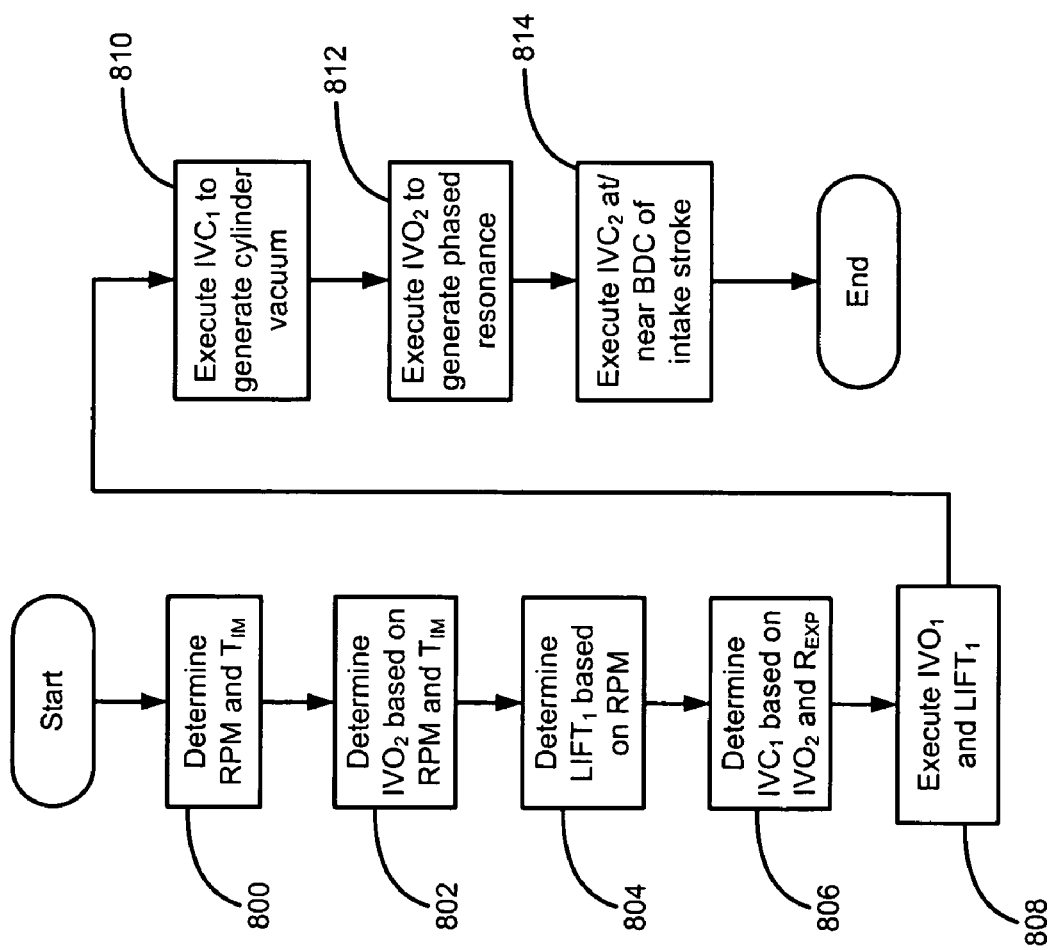
FIG. 8 is a flowchart illustrating exemplary steps executed by the induction tuning control of the present invention.

Referring now to FIG. 8, exemplary steps executed by the induction tuning control of the present invention will be described in detail. In step 800, control determines RPM and TIM based on the signals provided by the engine RPM and intake manifold temperature sensors, respectively. In step 802, control determines $IVO_2$ based on RPM and $T_{IM}$. More specifically, $IVO_2$ is determined from a look-up table that is indexed using RPM and $T_{IM}$ and that is created further based on $f_{INDSYS}$ and $V_{CYL}$. Control determines the minimum $LIFT_1$ based on RPM in step 804. In step 806, control determines $IVC_1$ based on $IVO_2$ and $R_{EXP}$.

Control executes $IVO_1$ and $LIFT_1$ in step 808 based on engine RPM. In step 810, control executes $IVC_1$ to generate a vacuum effect within the cylinder. In step 812, control executes $IVO_2$ to generate the phased resonance (i.e., resonance that is phased to $IVC_2$ at BDC). Control executes $IVC2$ at or near BDC of the intake stroke in step 814 and control ends. The combustion cycle is completed by compressing and igniting the combustion mixture within the cylinder, and the exemplary steps are again executed for the next engine cycle.

Figure 9:
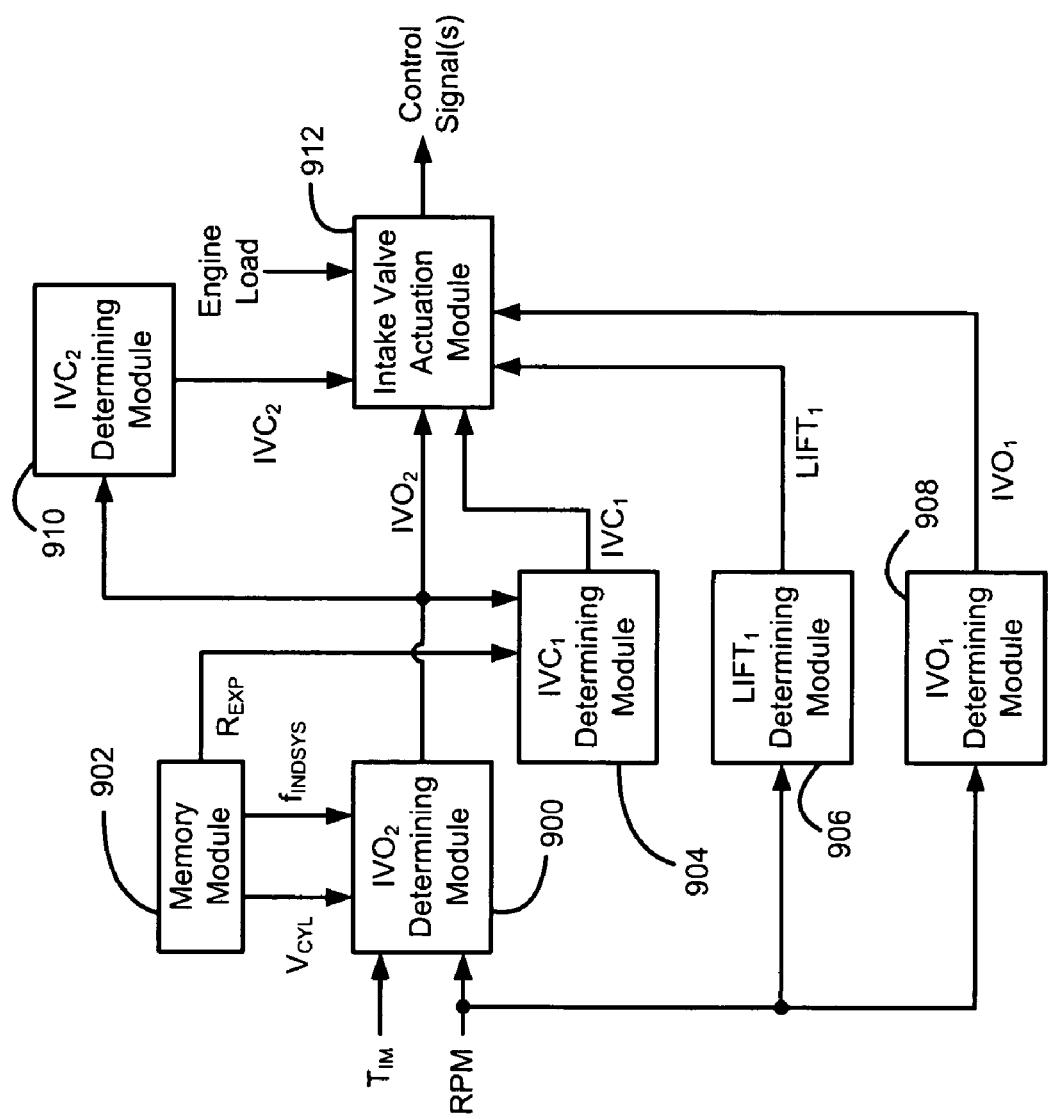
FIG. 9 is a functional block diagram of exemplary modules that execute the induction tuning control of the present invention.

Referring now to FIG. 9, exemplary modules that execute the induction tuning control of the present invention include an $IVO_2$ determining module 900, a memory module 902, and $IVC_1$ determining module 904, a $LIFT_1$ determining module 906, an $IVO_1$ determining module 908, an $IVC_2$ determining module 910 and an intake valve actuation module 912. The $IVO_2$ determining module 900 determines $IVO_2$ based on $T_{IM}$, RPM, $V_{CYL}$ and $f_{INDSYS}$. $V_{CYL}$ and $f_{INDSYS}$ are provided from the memory module 902. Although $IVO_2$ may be determined from a pre-programmed look-up table, it is also anticipated that the $IVO_2$ determining module 900 can calculate $IVO_2$ based on $T_{IM}$, RPM, $V_{CYL}$ and $f_{INDSYS}$.

The $IVC_1$ determining module 904 determines $IVC_1$ based on $IVO_2$ and $R_{EXP}$, which is provided from the memory module 902. The $LIFT_1$ determining module 906 determines $LIFT_1$ based on RPM. $IVO_1$ is determined by the $IVO1$ determining module 908 based on the engine RPM. $IVC_2$ is determined by the $IVC_2$ determining module 910 based on $IVO_2$. The intake valve actuation module 912 generates a control signal or control signals based on engine load (e.g., full or partial), $IVO_2$, $IVC_1$ and $LIFT_1$. More specifically, the control signal(s) control(s) the intake valve(s) to achieve the air ramming induction and increase $V_{EFF}$ in accordance with the present invention. It is anticipated that all valve actuation parameters can be determined from look-up tables based on engine speed, $T_{IM}$ and MAP.

The induction tuning control of the present invention enables the volumetric efficiency of the engine system to be significantly increased at engine speeds below that corresponding to $f_{INDSYS}$. Increases in volumetric efficiency of up to 30% are anticipated. The increased volumetric efficiency is achieved without additional components, such as impulse charging valves, and associated control systems. In this manner, the volumetric efficiency increase is achieved without the additional cost and complexity of traditional engine charging systems. Such a valve actuation system can also be used for part-load fuel economy improvements, using a different operating strategy.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A tuned induction control system for an engine having a piston that is reciprocally disposed in a cylinder, comprising:
a first module that actuates an intake valve associated with said cylinder;
a second module that determines a second intake valve open timing based on an intake air temperature and an engine speed, wherein said first module actuates said intake valve during a first intake event and actuates said intake valve during a second intake event that is subsequent to said first intake event, wherein said first and second intake events occur during a common intake stroke of said piston and said intake valve is opened at said second intake valve open timing during said second intake event.

2. The tuned induction control system of claim 1 wherein said second intake valve open timing is further based on a natural frequency of an induction system of said engine and a volume of said cylinder when said piston is at a bottom dead center position.

3. The tuned induction control system of claim 1 further comprising a third module that determines a first intake valve close timing based on said second intake valve open timing and an expansion ratio of said cylinder.

4. The tuned induction control system of claim 1 wherein said first module ends said first intake event by closing said intake valve at a first intake valve close timing, which occurs a predetermined time before said subsequent second intake event based on said second intake valve open timing.

5. The tuned induction control system of claim 1 wherein said first module initiates said first intake event near to said piston achieving a top dead center position during an exhaust stroke.

6. The tuned induction control system of claim 1 wherein said first module ends said subsequent second intake event near to said piston achieving a bottom dead center position during said intake stroke.

7. The tuned induction control system of claim 1 further comprising a third module that determines a minimum lift amount of said intake valve during said first intake event based on an engine speed.

8. A method of tuning an induction system of an engine having a cylinder that is reciprocally disposed in a piston to increase a volumetric efficiency of said engine, comprising:
determining a second intake valve open timing of an intake valve based on an intake air temperature and an engine speed;
actuating said intake valve during a first intake event; and
actuating said intake valve during a second intake event that is subsequent to said first intake event, wherein said first and second intake events occur during a common intake stroke of said piston and said intake valve is opened at said second intake valve open timing during said second intake event.

9. The method of claim 8 wherein said second intake valve open timing is further based on a natural frequency of an induction system of said engine and a volume of said cylinder when said piston is at a bottom dead center position.

10. The method of claim 8 further comprising determining a first intake valve close timing based on said second intake valve open timing and an expansion ratio of said cylinder.

11. The method of claim 8 further comprising ending said first intake event by closing said intake valve at a first intake valve close timing, which occurs a predetermined time before said second intake event based on said second intake valve open timing.

12. The method of claim 8 further comprising initiating said first intake event prior to said piston achieving a top dead center position during an exhaust stroke.

13. The method of claim 8 further comprising ending said subsequent second intake event prior to said piston achieving a bottom dead center position during said intake stroke.

14. The method of claim 8 further comprising determining a minimum lift amount of said intake valve during said first intake event based on an engine speed.

15. A method of tuning an induction system of an engine having a piston that is reciprocally disposed in a cylinder to increase a volumetric efficiency of said engine, comprising:
determining a second intake valve open timing of an intake valve based on an intake air temperature and an engine speed;
actuating said intake valve during a first intake event;
determining a first intake valve close timing based on said second intake valve open timing and an expansion ratio of said cylinder;
ending said first intake event by closing said intake valve at a first intake valve close timing, which occurs a predetermined time before a second intake event; and
actuating said intake valve during said second intake event, which is subsequent to said first intake valve event, wherein said first and second intake events occur during a common intake stroke of said piston and said intake valve is opened at said second intake valve open timing during said second intake event.

16. The method of claim 15 wherein said second intake valve open timing is further based on a natural frequency of an induction system of said engine and a volume of said cylinder when said piston is at a bottom dead center position.

17. The method of claim 15 further comprising initiating said first intake event near to said piston achieving a top dead center position during an exhaust stroke.

18. The method of claim 15 further comprising ending said second intake event near to said piston achieving a bottom dead center position during said intake stroke.

19. The method of claim 15 further comprising determining a minimum lift amount of said intake valve during said first intake event based on an engine speed.

* * * * *